June 6, 1933. A. D. POOLE 1,912,497
INTERNAL COMBUSTION ENGINE
Filed March 17, 1928  3 Sheets-Sheet 3
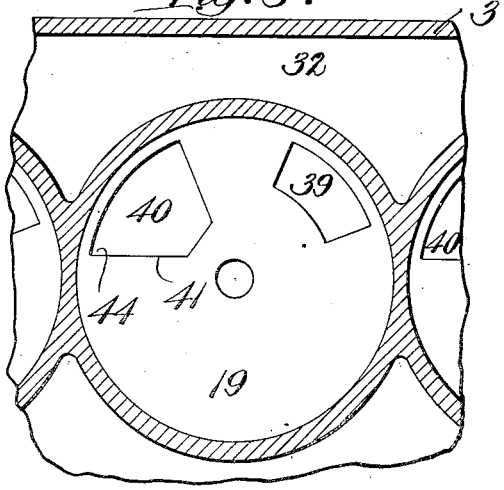
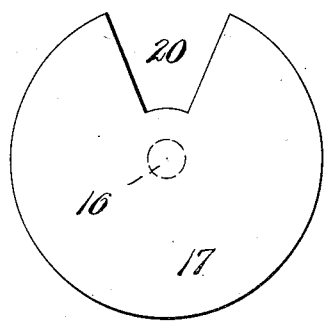
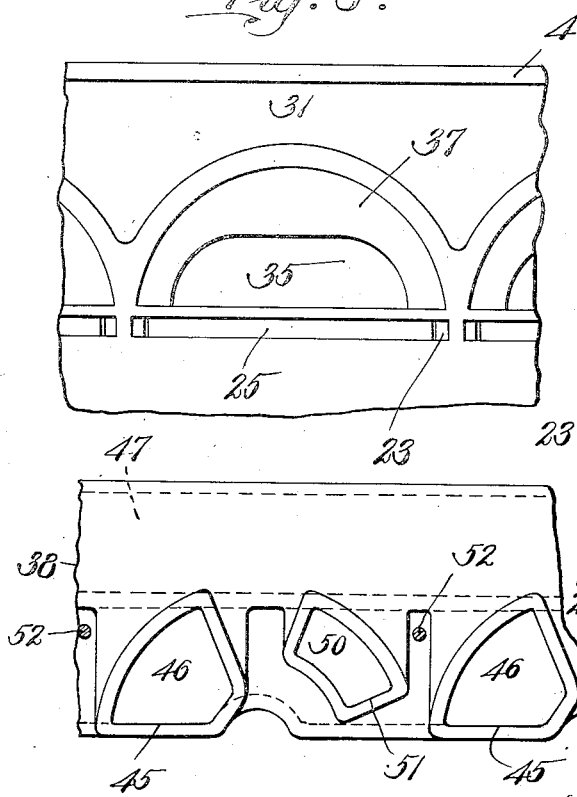
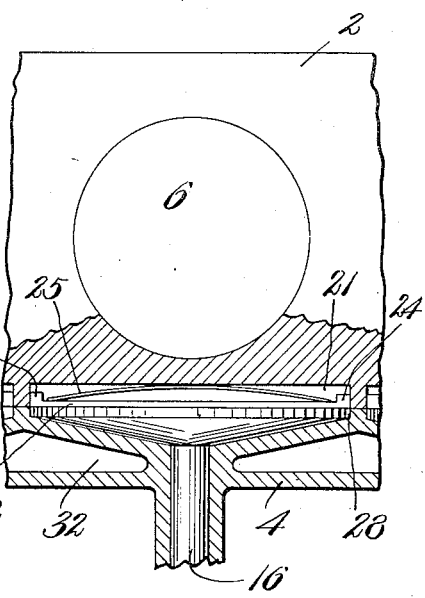

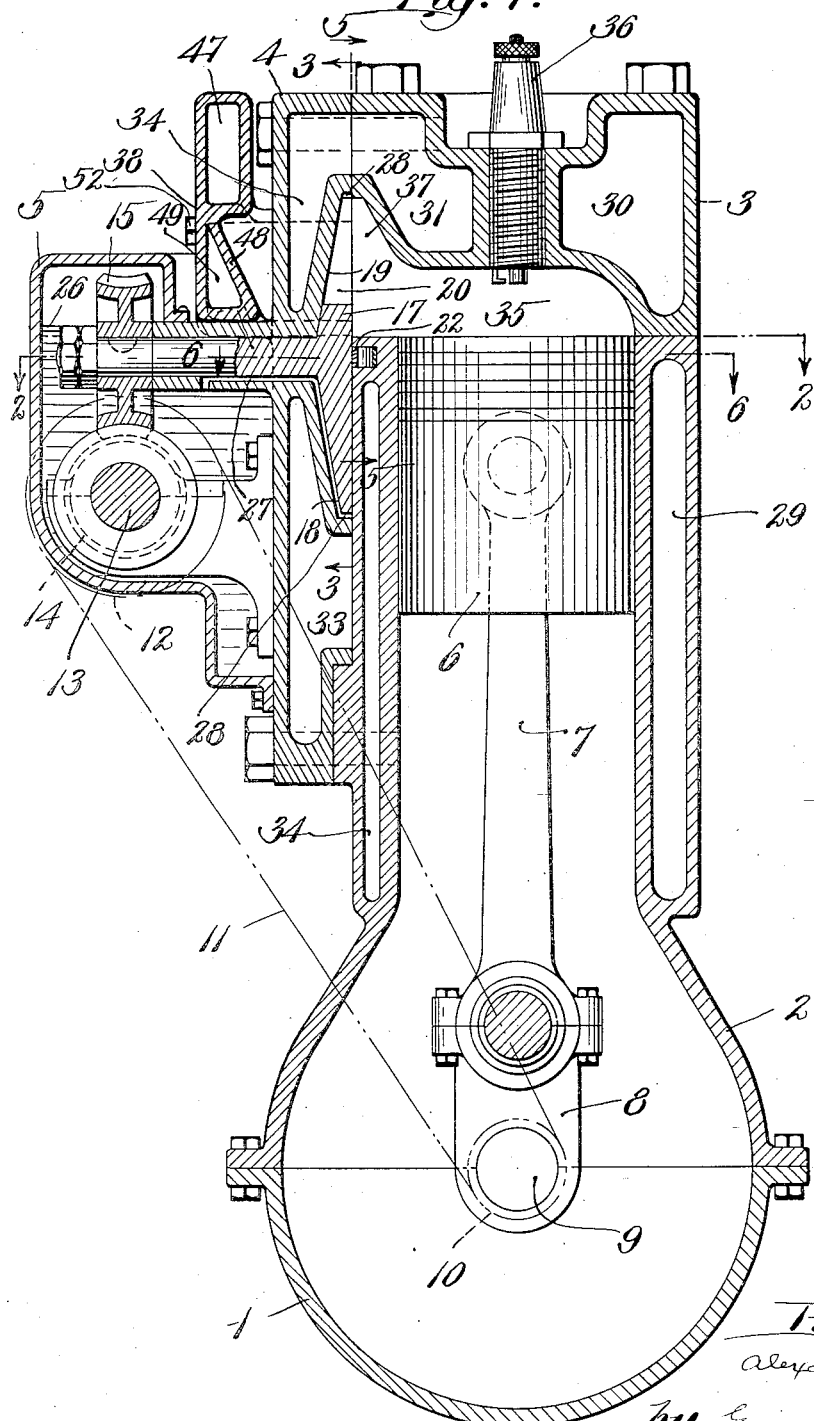

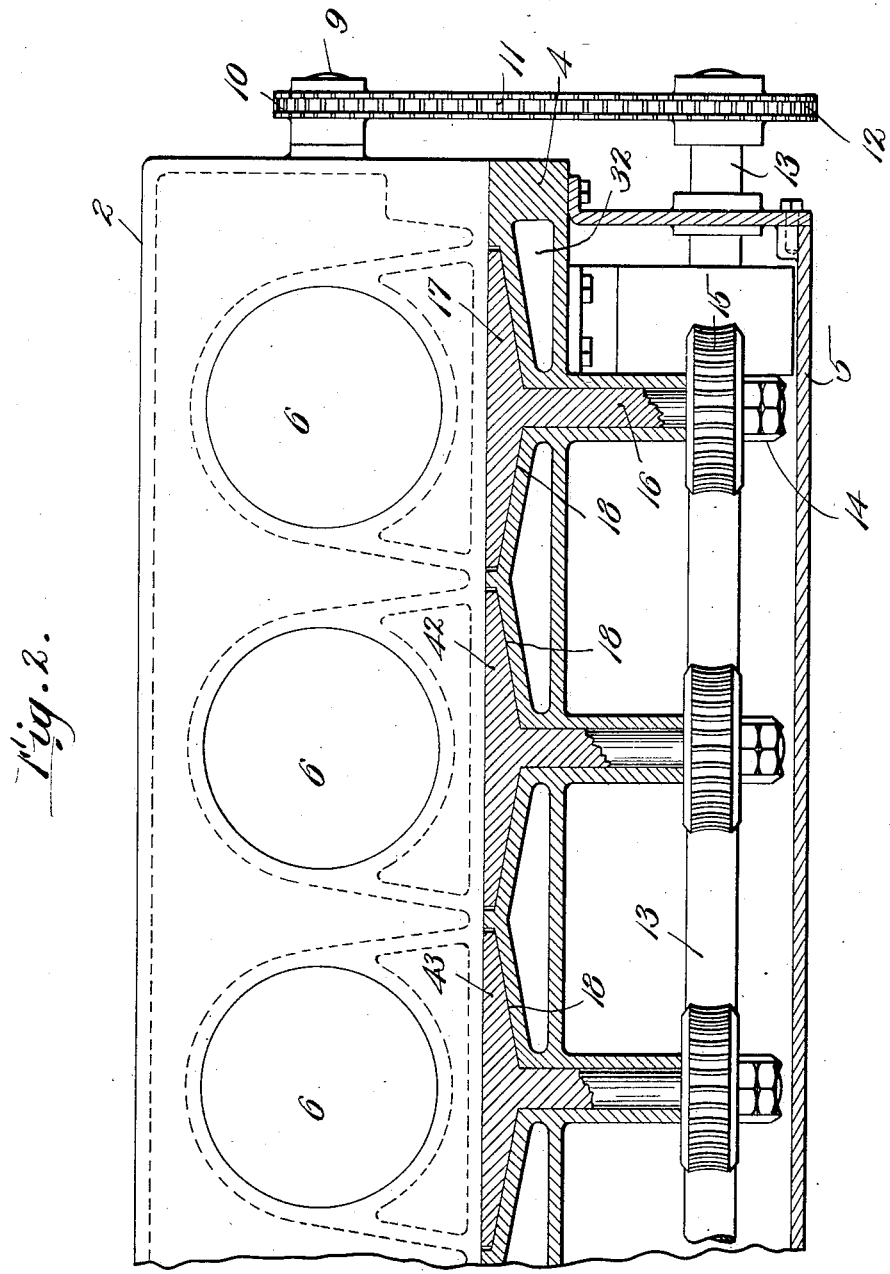

Patented June 6, 1933

1,912,497

UNITED STATES PATENT OFFICE

ALEXANDER D. POOLE, OF NASHUA, NEW HAMPSHIRE, ASSIGNOR TO POOLE ROTARY VALVE ENGINE CO., OF BOSTON, MASSACHUSETTS, A CORPORATION OF MASSACHUSETTS

INTERNAL COMBUSTION ENGINE

Application filed March 17, 1928. Serial No. 262,384.

This invention relates to internal combustion engines especially adapted for use in motor vehicles, an object of the invention being to provide an improved engine of the type having exhaust and intake ports controlled by means of a rotary disk valve, the improved construction being such as to provide greater efficiency in operation, greater simplicity in operating parts, and less fuel consumption for the same power developed.

A further object of the invention is to provide an engine having a preferably vertical rotary disk valve forming one side or a part of a wall of the combustion chamber; in which the valve is sealed against the leakage of gases and may be efficiently lubricated during operation without the leakage of oil into the cylinder; wherein the complete venting of the burnt gases is accomplished; and in which the improved construction is such that the burnt gases are partially exhausted before the completion of the power stroke of the piston thereby decreasing the load on the piston when forcing the burnt gases from the cylinder.

Other objects of this invention will appear in the following description and appended claims, reference being had to the accompanying drawings forming a part of this specification wherein like reference characters designate corresponding parts in the several views.

Figure 1 is a central vertical section of an internal combustion engine embodying my invention;

Figure 2 is a section on line 2—2 of Figure 1;

Figure 3 is a partial section on line 3—3 of Figure 1;

Figure 4 is a face view of the valve;

Figure 5 is a partial elevation looking in the direction of the arrows 5 in Figure 1, the gear housing and valve seat casing being removed;

Figure 6 is a section on line 6—6 of Figure 1; and

Figure 7 is a cross section of the manifold taken through the intake opening.

Crank case 1 is suitably connected to cylinder casting 2, to which is suitably bolted the head casting 3. The valve seat casing 4 is bolted to castings 2 and 3 and the gear housing 5 is suitably connected to casing 4. Piston 6 works within the cylinder and is connected to connecting rod 7 and the latter to crank 8, the crank being mounted on shaft 9 which carries sprocket 10, the latter being connected by chain 11 with sprocket 12, the diameters of the sprockets being such that sprocket 10 makes two revolutions for one revolution of sprocket 12.

Sprocket 12 is fixed to shaft 13, to which is fixed gear 14, the latter cooperating with worm 15 and the worm making one revolution for one of gear 14. The worm 15 has fixed connection with horizontal stem 16, which has integral with it the valve 17 which has a bevelled or cone-shaped face 18 to engage the bevelled valve seat 19, the valve 17 being provided with port 20. To prevent leakage of gas between the valve and the cylinder casting I provide a recess 21 in the cylinder casting in which is placed a metal strip 22 having lugs 23 and 24 at its ends. A leaf spring 25 bears, at its centre against the rear of recess 21, and at its ends against said lugs, and tends to force the strip 22 against the valve and consequently prevents leakage.

The gear housing 5 is filled with oil 26 to about the level shown and the oil passes through conduit 27, the latter including a recess in the face of the valve seat, and is thus fed to the annular space 28 extending annularly around the valve. The space forms a sealed or closed pocket housing the lower part of the valve against the escape of gases.

I provide water jackets 29, 30, 31, 32, 33 and 34, and I wish to point out that my engine and especially the valve is very completely water jacketed.

The combustion chamber has a main portion 35 into which extends the bottom of spark plug 36 and it has also a pocket 37 which extends well above the main portion for the quick venting of the burnt gases and also for the carrying of such burnt gases away from the bottom of the spark plug.

The gas enters by way of manifold 38 and passes through intake port 39 and exhaust port 40, both being in the valve seat. The exhaust port has its lower face 41 out of line radially for a purpose described below.

In Figure 2 I illustrate three valves, 17, 42 and 43, in operative connection with shaft 13, but it will be understood that any desired number, and consequently any desired number of cylinders, may be used.

At the beginning of the operation of my engine, that is, at the start of the down, or intake, stroke the valve 17, which has covered both ports 39 and 40, begins to move and exposes the intake port 39 allowing the gas to fill the cylinder and on the following up, or compression stroke, both ports 39 and 40 are entirely closed and remain closed during the explosion, or following, down stroke. At the end of the explosion stroke the valve opens the exhaust port 40, still covering the intake port 39. After the exhaust stroke the valve returns to its original position, closing both ports 39 and 40, and then the cycle is repeated.

It will be observed that pressure in the combustion chamber tends to force the valve against its seat, thus effectually sealing the combustion chamber.

I provide a pocket 37 which is higher than the main portion of the top of the combustion chamber, one purpose being to make possible larger ports that more freely conduct the burnt gases away from the bottom of the spark plug and away from the main portion of the top of the combustion chamber so that there will be quick and complete venting of such burnt gases. In cooperation with said pocket I preferably provide wall 41 of the exhaust port out of line radially so as to form a corner space 44 through which the burnt gases from pocket 37 will be quickly vented even before normal opening of the exhaust port takes place, that is, after the pushing force of the gas on the explosion stroke has reached its effectiveness and before the piston has reached the end of the stroke thus relieving the piston of a large portion of the back pressure on the return stroke.

My valve may have a very large port because of the raised or pocket portion 37, a large port being very desirable for quick and complete venting.

My invention permits of a very small and compact combustion chamber because all the gases are burnt up and vented and no extra space in the combustion chamber is needed because I have no spent gases remaining in the chamber.

The manifold 38 has exhaust port 45 in line with exhaust port 40 and this exhaust port 45 opens to portion 46 which leads to passage 47 which is located above partition 48 and passage 47 is completely unobstructed and of relatively very large rectangular cross-section. Passage 49 is for the intake and is located below partition 48, the latter extending longitudinally of, and diagonally across the lower portion of, the manifold. A passage 50 conducts the intake gas from passage 49 to the intake port 51 of the manifold, this port 51 being in line with intake ports 39.

Suitable bolts 52 hold the manifold in place.

I preferably key the worm 15 to the valve stem 16 so as to permit axial adjustment, the valve stem being mounted in a tubular bearing and having its end threaded to receive a nut and check nut, the worm being between the nut and tubular bearing, and the nut and check nut acting to hold the valve firmly against its seat.

It will be seen from the foregoing that by mounting the disk valve 17 in an upright or substantially vertical position in a plane preferably at one side of the cylinder, efficient lubrication of the valve is possible without any substantial leakage of the oil into the cylinder. Moreover, this construction enables the combustion space above the cylinder, together with the cylinder head, to be designed independently of the valve. Thus, the vertical valves can be lubricated without dropping or throwing oil into the combustion chamber, which occurs in the case of horizontal valves in head when attempted to be lubricated. Furthermore, the valves do not interfere with the spark plug operation, and the position of the valves permits greater freedom in locating the spark plugs.

By virtue of the fact that the lower part of each valve disk is confined or housed within the pocket 28, which is closed or sealed, no escape of gases past the valve is possible. Moreover, since the upper part of the valve disk itself forms one side, or a part of the wall, of the combustion chamber, and since the valve port 20 extends substantially to the top of the combustion chamber, complete venting of the burnt gases is possible, efficient seating of the valve is permitted thereby reducing loss of power, and adequate means may be provided for cooling the valve.

Another advantage of my invention is that the gas goes directly into the combustion chamber and directly out to the manifold without the use of conduits between the valve and combustion chamber and consequently I avoid parts that may interfere with, or retard, efficient operation.

A feature of advantage of my valve is that its face is cone-shaped or bevelled and consequently it is stronger and less likely to spring or warp than prior valves.

It will also be noted that both intake and exhaust ports 39 and 40 are preferably substantially segmental, the outer wall or edge of each being formed on an arc substantially concentric with the peripheral edge of the disk 17. The exhaust port 40 however is formed on an arc not only substantially wider than that of the port 39 but also of the port 20. Hence, before the piston reaches the limit of the power stroke, valve port 20 partially registers with exhaust port 40, so that the latter starts to open. This operation relieves somewhat the pressure before the piston starts upwardly on the exhaust stroke, so that the load on the piston in forcing the burnt gases out through the exhaust port is greatly decreased.

It will also be seen that the exhaust port 40 is also preferably deeper than the intake port 39 and may have as much as three times the area of the intake port, which construction facilitates adequate venting of the burnt gases.

It is to be noted that my construction provides for ease and economy of manufacture and provides ready accessibility of the parts for repair or other purposes.

My construction of manifold provides for keeping the intake gases very hot.

What I claim is:

1. The combination of a fixed member having a recess; a valve adjacent to said fixed member; a valve seat therefor; a movable member within said recess and bearing against said valve; and a leaf spring within said recess and located between said movable member and the rear wall of the recess and pressing the movable member against the valve to prevent leakage of gas.

2. An internal combustion engine comprising a combustion chamber; a wall for said chamber and having a recess; a rotary valve; a seat for said valve; a movable member in said recess; and resilient means located in said recess and pressing the movable member against the valve to prevent leakage of gas.

ALEXANDER D. POOLE.